United States Patent
Intrater

(10) Patent No.: US 11,704,258 B2
(45) Date of Patent: Jul. 18, 2023

(54) LATENCY REDUCTION IN SPI FLASH MEMORY DEVICES

(71) Applicant: Dialog Semiconductor US Inc., Santa Clara, CA (US)

(72) Inventor: Gideon Intrater, Sunnyvale, CA (US)

(73) Assignee: Dialog Semiconductor US Inc., Santa Clara, CA (US)

( * ) Notice: Subject to any disclaimer, the term of this patent is extended or adjusted under 35 U.S.C. 154(b) by 58 days.

(21) Appl. No.: 17/399,263

(22) Filed: Aug. 11, 2021

(65) Prior Publication Data

US 2023/0050986 A1    Feb. 16, 2023

(51) Int. Cl.
*G06F 13/16* (2006.01)
*G06F 12/02* (2006.01)
*G06F 12/1081* (2016.01)
*G06F 13/42* (2006.01)

(52) U.S. Cl.
CPC ........ *G06F 13/161* (2013.01); *G06F 12/0238* (2013.01); *G06F 12/1081* (2013.01); *G06F 13/1689* (2013.01); *G06F 13/4282* (2013.01)

(58) Field of Classification Search
CPC .............. G06F 12/0238; G06F 12/1081; G06F 13/161; G06F 13/1689; G06F 13/4282
See application file for complete search history.

(56) References Cited

U.S. PATENT DOCUMENTS

| | | |
|---|---|---|
| 6,321,315 B1 | 11/2001 | LaBerge |
| 7,562,180 B2 | 7/2009 | Gyl et al. |
| 7,593,263 B2 | 9/2009 | Sokolov et al. |
| 7,912,997 B1 * | 3/2011 | Murray ................. G06F 13/28 713/400 |
| 8,271,700 B1 * | 9/2012 | Annem ................. G06F 13/28 710/22 |
| 8,806,071 B2 | 8/2014 | Zitlaw |
| 8,966,151 B2 | 2/2015 | Zitlaw |
| 9,454,421 B2 | 9/2016 | McClain et al. |
| 9,812,183 B2 | 11/2017 | Intrater et al. |
| 10,290,334 B2 | 5/2019 | Intrater et al. |
| 10,726,888 B2 | 7/2020 | Intrater et al. |
| 2004/0003192 A1 * | 1/2004 | Qawami ............... G06F 13/161 711/167 |
| 2008/0175072 A1 * | 7/2008 | Norman ............... G11C 7/1078 365/189.05 |
| 2010/0124102 A1 | 5/2010 | Lee et al. |
| 2015/0143020 A1 | 5/2015 | Ferreira et al. |
| 2017/0060579 A1 * | 3/2017 | Vincent ................ G06F 9/3838 |
| 2021/0182063 A1 * | 6/2021 | Redington .......... G06F 9/30032 |

* cited by examiner

*Primary Examiner* — Eric T Oberly

(57) ABSTRACT

A method can include: receiving, in a memory device, a read request from a host device that is coupled to the memory device by an interface; decoding an address of the read request that is received from the interface; decoding a command of the read request to determine whether the read request is for an aligned address operation; maintaining the decoded address without modification when the read request is determined as being for the aligned address operation regardless of an actual alignment of the decoded address; and executing the read request as the aligned address operation on the memory device by using the decoded address.

18 Claims, 15 Drawing Sheets

LATENCY REDUCTION IN SPI FLASH MEMORY DEVICES

FIELD OF THE INVENTION

The present invention generally relates to the field of semiconductor devices. More specifically, embodiments of the present invention pertain to memory devices, including both volatile and non-volatile memory devices, such as flash memory devices.

BACKGROUND

Non-volatile memory (NVM) is increasingly found in applications, such as solid-state hard drives, removable digital picture cards, automotive electronics, home appliances, and so on. Flash memory is the predominant NVM technology in use today. However, flash memory has limitations, such as a relatively high power, as well as relatively slow operation speed. Microprocessor performance can be very sensitive to memory latency. Many non-volatile memory devices have an access time or latency that is relatively slow as compared to the microprocessor. In addition, many implementations of various communication protocols between a microprocessor/host and memory, such as serial peripheral interface (SPI) can add even more latency than is required by the memory array itself.

DETAILED DESCRIPTION OF EMBODIMENTS

Figure 1:
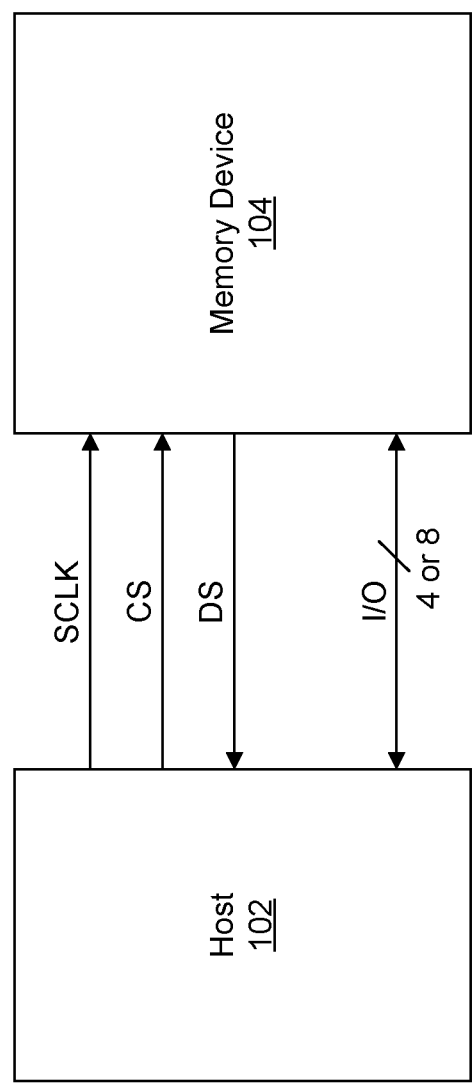
FIG. 1 is a schematic block diagram of an example host and memory device arrangement, in accordance with embodiments of the present invention.

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device, and/or memory. These descriptions and representations are generally used by those skilled in the data processing arts to effectively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

Particular embodiments may be directed to memory devices, including volatile memory, such as SRAM and DRAM, and including non-volatile memory (NVM), such as flash memory devices, and/or resistive switching memories (e.g., conductive bridging random-access memory [CBRAM], resistive RAM [ReRAM], etc.). Particular embodiments can include structures and methods of operating flash and/or resistive switching memories that can be written (programmed/erased) between one or more resistance and/or capacitive states. In one particular example, a CBRAM storage element may be configured such that when a forward or reverse bias greater than a threshold voltage is applied across electrodes of the CBRAM storage element, the electrical properties (e.g., resistance) of the CBRAM storage element can change. In any event, certain embodiments are suitable to any type of memory device, and in particular NVM devices, such as flash memory devices, and may include resistive switching memory devices in some cases.

Referring now to FIG. 1, shown is an example memory device and host arrangement 100, in accordance with embodiments of the present invention. In this example, host 102 can interface with memory device 104 via a serial interface. For example, host 102 can be any suitable controller (e.g., CPU, MCU, general-purpose processor, GPU, DSP, etc.), and memory device 104 can be any type of memory device (e.g., SRAM, DRAM, EEPROM, Flash, CBRAM, magnetic RAM, ReRAM, etc.). Memory device 104 can thus be implemented in a variety of memory technologies, such as non-volatile types. In some cases, memory device 104 can be a serial flash memory that may be implemented in more traditional non-volatile memories, or in CBRAM/ReRAM resistive switching memories.

Various interface signals, such as in a serial peripheral interface (SPI), can be included for communication between host 102 and memory device 104. For example, serial clock (SCK) can provide a clock to device 104, and may be used to control the flow of data to the device. Command, address, and input data (e.g., via I/O pins) can be latched by memory device 104 on a rising edge of SCK, while output data (e.g., via I/O pins) can be clocked out of memory device 104 by SCK or data strobe (DS). Chip select (CS), which may be active low, can be utilized to select memory device 104, such as from among a plurality of such memory devices sharing a common bus or circuit board, or otherwise as a way to access the device. When the chip select signal is de-asserted (e.g., at a high level), memory device 104 can be deselected, and placed in a standby mode. Activating the chip select signal (e.g., via a high to low transition on CS) may be utilized to start an operation, and returning the chip select signal to a high state can be utilized for terminating an operation. For internally self-timed operations (e.g., a program or erase cycle), memory device 104 may not enter standby mode until completion of the particular ongoing operation if chip select is de-asserted during the operation.

In the example interface, data can be provided to (e.g., for write operations, other commands, etc.) and from (e.g., for read operations, verify operations, etc.) memory device 104 via the I/O signals. For example, input data on the I/O can be latched by memory device 104 on edges of serial clock SCK, and such input data can be ignored if the device is deselected (e.g., when the chip select signal is de-asserted). Data can be output from memory device 104 via the I/O signals as well. For example, data output from memory device 104 can be clocked out on edges of DS or SCK for timing consistency, and the output signal can be in a high impedance state when the device is deselected (e.g., when the chip select signal is de-asserted). For example, input data may be clocked either on one edge (SDR/STR) or both edges (DDR/DTR) of SCK for command, address, or data, or a combination of both. Similarly, output data may be clocked on either one edge (SDR/STR) or both edges (DDR/DTR) of SCK or DS for data. Further, output data may, but is not required to, use the same clocking mode as the input data. Also, in some devices/arrangements, DS can be an optional signal. Further, while 4 or 8 I/O lines are shown in the particular example of FIG. 1, any number of I/O lines (e.g., 1, 2, 4, 8, 16, etc.) can be supported in certain embodiments.

Serial flash devices may generally include two types of read commands: one with no addressing limitations (e.g., the EBh SPI command); and another with an address that is aligned on a double-word boundary (DWA) (e.g., the E7h SPI command). Due to the internal structure of the flash memory array, the read latency of the DWA command can be shorter than the latency for the read command that has no addressing limitations. In particular embodiments, the alignment does not have to be set at 4 bytes or a double-word, and instead can be any suitable addressable data portion (e.g., 2, 4, 8, 16, etc. bytes), based on the particular memory array configuration. Other parameters that impact CPU throughput and power consumption, such as the minimal required time between SPI commands or the "gap" between commands, may also depend on the type and the length of each specific command.

Figure 2:
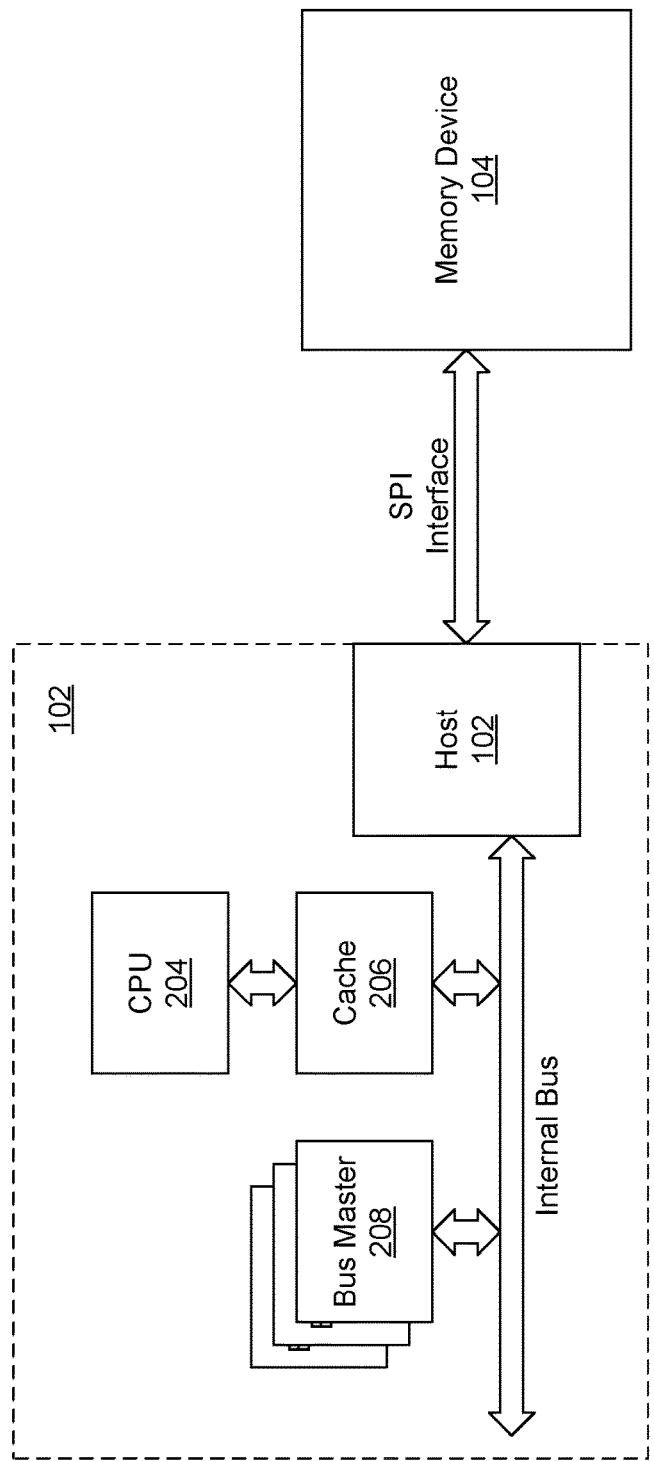
FIG. 2 is a schematic block diagram of an example memory controller system, in accordance with embodiments of the present invention.

Referring now to FIG. 2, shown is a schematic block diagram of an example memory controller system, in accordance with embodiments of the present invention. In example 200, microcontroller unit (MCU) 202 can include host device 102, CPU 204, cache 206, and bus master(s) 208. For example, MCU 202 can be a system-on-a-chip (SoC), cache 206 can include SRAM, and each bus master 208 can be any device or controller IP that can take control of the SPI bus. The internal bus, which can interface between host 102, cache 206, and bus masters 208, can include address, data, and control signaling. For example, the interface between host 102 and memory device 104 can be an SPI interface.

Particular embodiments may generally apply to systems that operate in the eXecute-in-Place (XiP) mode. In this system, the CPU (e.g., through an optional cache memory) and other bus master(s) may generate read requests to the SPI host 102, and the SPI host may then translate these requests to SPI commands that are sent to the external flash memory device(s) 104. The CPU throughput and power consumption in such systems may be particularly sensitive to the read latency from the flash device, and to the minimum allowable gap between two consecutive commands, as these read operations can be used for handling instruction cache misses. As such, a read command with an aligned address (e.g., DWA) can result in improved system performance (e.g., improved CPU throughput), as well as reduced power consumption.

The SPI host controller in many SoCs can be programmed to generate a specific SPI command in response to a read request from one of bus masters 208. In most such systems, the command used is the EBh command or a similar command that does not have address alignment limitations. This is due to the mix of aligned and non-aligned requests that may arrive from the various SoC bus masters 208 and CPU 204 or associated cache 206 in host 102. Instruction cache misses are typically aligned to a double-word boundary, and thus are suitable for DWA read operations, and/or commands that require a minimal gap therebetween. However, user's software can inject non-aligned reads into the stream of flash memory commands. Further, the CPU may not have a way to send different types of read commands to the flash memory that depend on the alignment of the requested addresses, or make other optimizations to the SPI command that is used for each requested read operation. In addition, direct memory access (DMA) engines, which are a type of bus master(s) 208, can also generate non-aligned transactions to the flash memory device(s).

Address alignment is a specific attribute of the E7h DWA command, and this is typically taken into account during execution of this command on the flash memory device. Along these lines, regardless of the address that is being sent within the command on the SPI bus, the flash device may clear the least significant bits (LSBs) of the address (e.g., 2 LSBs) to ensure that the returned data is aligned by way of its address. Accordingly, even though most of the read accesses to the flash device are inherently aligned, the system may be forced to use a less efficient read command (e.g., the EBh command) for all read accesses to accommodate those read accesses that are not aligned. In particular embodiments, a new mode of operation for the E7h DWA command can enable using this command instead as the main read command in the system. Implementation of this mode of operation may require only a small number of extra gates added to the flash memory device. In addition, a configuration bit (e.g., from a status register) can be included in order to ensure backward compatibility, such as by enabling the new functionality when this configuration bit is set (e.g., logic '1'). In certain embodiments, the new mode of operation can be utilized with any designated read command (e.g., the EBh command), in order to function as an aligned read operation based on the configuration bit (e.g., ALN status bit in in the status register).

Figure 3:
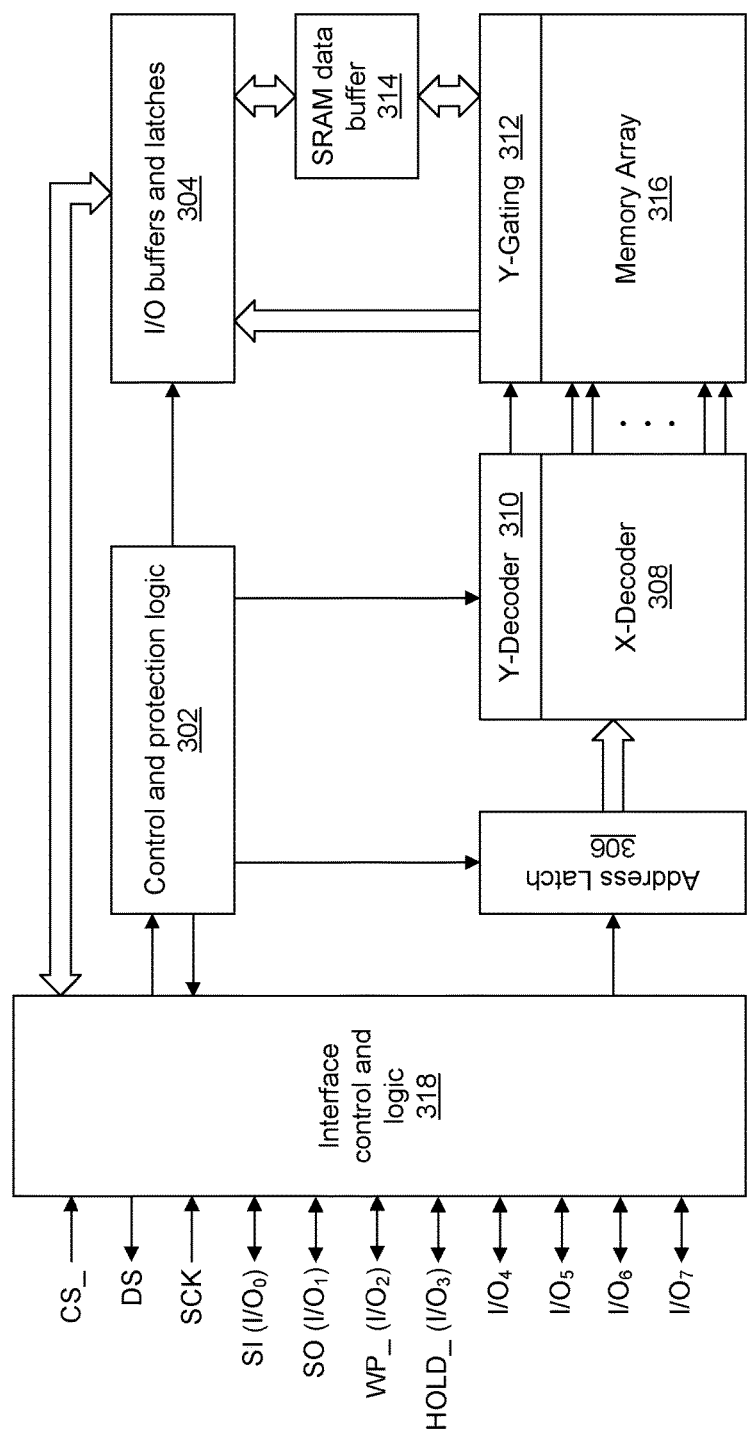
FIG. 3 is a schematic block diagram of an example memory device, in accordance with embodiments of the present invention.

Referring now to FIG. 3, shown is a schematic block diagram of an example memory device, in accordance with embodiments of the present invention. Memory device 104 can include interface control and logic 318, which may manage the interface (e.g., SPI interface), and decode the command and address information therefrom. Control and protection logic 302 can include control circuitry for reading and writing to the memory array, including address mapping and control for byte access and group addressing/ordering. For example, control and protection logic 302 can include a command decoder, registers for command execution parameters (e.g., read parameters, program/erase parameters, etc.), as well as a controller for command execution.

I/O buffers and latches 304 can control the input of data from interface control and logic 318, and the output of data to interface control and logic 318. For example, chip select based control and clock based control of data read from memory array 316 can be accommodated via I/O buffers and latches 304. That is, registers/latches in I/O buffers and latches 304 can be controlled by way of the toggling of serial clock SCK during burst reads and sequential fetch operations, as described herein. SRAM data buffer(s) 314 can buffer/store data between memory array 316 and I/O buffers and latches 304. Address latch block 306 can receive address information via interface control and logic 318, and may provide latched addresses to X-decoder 308 for row addresses, and to Y-decoder 310 for column addresses. Incrementing of addresses can be performed via address latch block 306 and/or control and protection logic 302. Y-decoder 310 can provide column addresses to Y-Gating 312, which can include pass gates or the like to multiplex I/O lines to/from memory array 316. As discussed above, memory array 316 can include an array of volatile memory cells, or non-volatile memory cells (e.g., CBRAM, ReRAM, Flash, etc.).

In some arrangements, more than one buffer 314 (e.g., SRAM or other fast access memory) can be provided, such as a buffer for an input path, and another buffer for an output path. Alternatively, or in addition, multiple buffers can be provided for multi-layer buffering. For example, memory device 104 can be configured as a data flash and/or a serial flash device. Memory array 316 can be organized as any suitable number of pages of data. For example, each page can include 256 or 264 bytes of data. Similarly, buffer 314 can store at least a page of data. I/O interface 318 can provide interfacing between memory array 316, buffer 314, and serial data input (SI) and output (SO). For example, I/O interface 318 may be part of an SPI or other serial type of interface, and may also support a number of SPI interface modes (e.g., Single SPI, QPI, Octal, ×16 modes, etc.).

Figure 4:
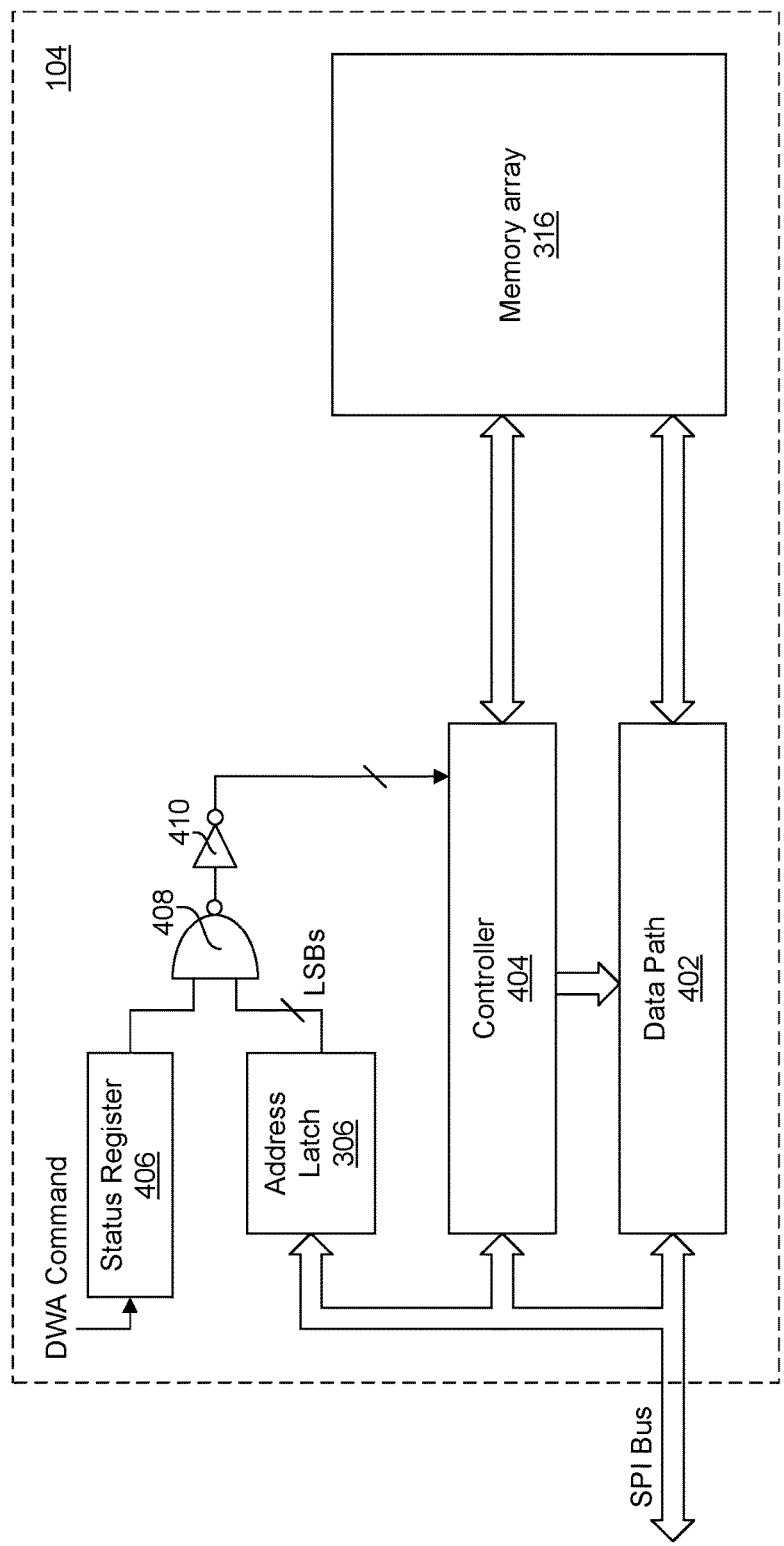
FIG. 4 is a schematic block diagram of an example memory device with read request modification control, in accordance with embodiments of the present invention.

Referring now to FIG. 4, shown is a schematic block diagram of an example memory device with read request modification control, in accordance with embodiments of the present invention. In example 400, memory device 104 can include memory array 316, data path 402 (e.g., buffer 314 and I/O interface 318 of FIG. 3), controller 404, address latch 306, and status register 406. In one particular example, backward compatibility can be supported within the modified DWA read command by using a configuration bit from status register 406. For example, if a DWA command, or other designated read command (e.g., EBh), is encountered and the configuration bit is cleared (e.g., logic '0'), NAND-gate 408 and inverter 410 can ensure that the LSBs from address latch 306 are cleared prior to the access of memory array 316. In this arrangement, if a DWA or other designated read command is not encountered or if the configuration bit is set (e.g., logic '1'), the gating input to NAND-gate 408 may be high in order to allow the latched or decoded address as received from the SPI bus to pass through without modification for the read access of memory array 316.

As used herein, an address is "modified" if the relationship between the original address and the modification of that address is different and results in access of data from a different memory address location. For example, if an address is simply re-mapped or re-encoded, while still maintaining the same one to one relationship between the original address and the re-mapped/re-encoded address (e.g., in a translation from a virtual to a physical address), this would be considered as "without modification." As such, performing a "NOT" operation on each of the address bits (e.g., address 0b0101000 becomes 0b1010111) would also be considered "without modification," while clearing LSBs or other predetermined address bits is considered to be an address modification. In this way, the address that is presented to the memory array is different than the address sent by the CPU when that address is "modified."

Particular embodiments may be suitable to any type of read operation, such as any of the SRI protocol modes (e.g., 1-x-x, 4-x-x, 8-x-x, 0-x-x, 0-4-4, etc.). In this notation, e.g., the first, second, and third number positions may respectively represent the number of data lines on which a command, an address, and the data is sent. In the 0-x-x or 0-4-4 mode, the opcode can be implied and thus may not be explicitly sent with every SPI read transaction. Since the opcode is missing in this command, the interleaving of EBh and E7h commands that do explicitly include an opcode can become time consuming and inefficient in this case.

In this way, all XiP read requests, which can be aligned by design, may utilize suitable read commands (e.g., the DWA read command) or other modified read commands (e.g., the EBh read command) that have a reduced number of dummy cycles, as compared to other standard read command options. As a result, read latency can be reduced, in order to improve the CPU throughput. This can improve overall system performance, as the CPU may have to wait less time for servicing an instruction cache miss. This can also effectively improve the power consumption, as the CPU may spend less time in the sub-optimal state of waiting for an instruction cache miss service.

Figure 5:
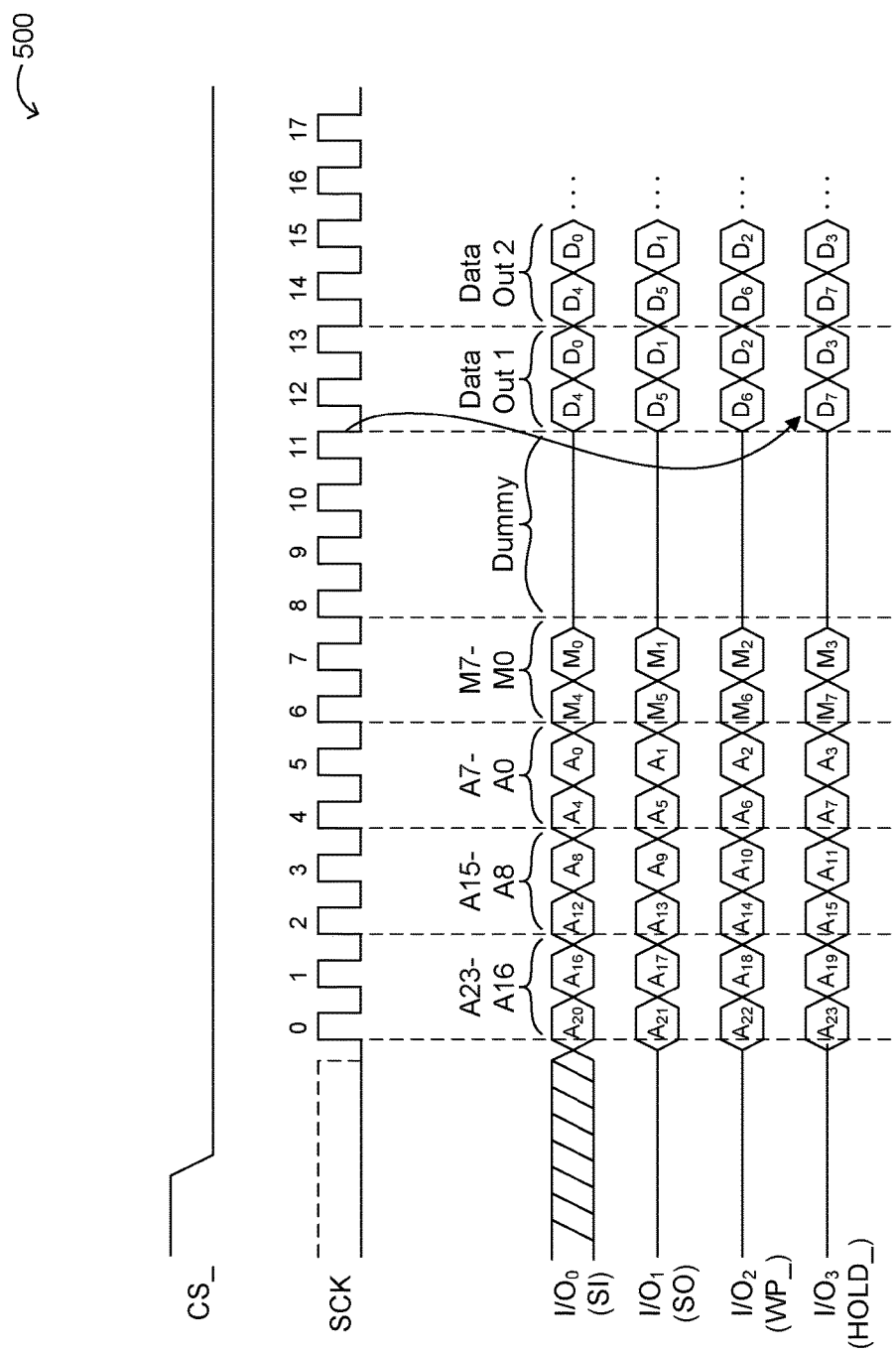
FIG. 5 is a timing diagram of an example read access, in accordance with embodiments of the present invention.

Referring now to FIG. 5, shown is a timing diagram of an example read access, in accordance with embodiments of the present invention. Example 500 shows a high-performance SPI read command that is a transaction in the XiP mode (sometimes called continuous mode) where the read command is implicit and its format is 0-4-4. Each byte takes two cycles of SCK over the four IO lines. In cycles 0 and 1, most significant address byte A23-A16 can be received, in cycles 2 and 3 address byte A15-A8 can be received, and in cycles 4 and 5 address byte A7-A0 can be received. Thus, 6 cycles can be used to receive the address via 4 pins. In cycles 6 and 7, the mode byte M7-M0 can be received. Thus, two cycles can be used to receive the mode byte via 4 pins, in order to indicate that the device should stay in the XiP mode. The dummy cycles can be cycles 8 through 11 for this example read command. Thus in this example, four cycles are shown for the dummy cycles prior to data being output from the flash memory starting at the falling edge of clock 11, and 16 cycles additional can be used to output an 8-byte cache line of data.

Figure 6:
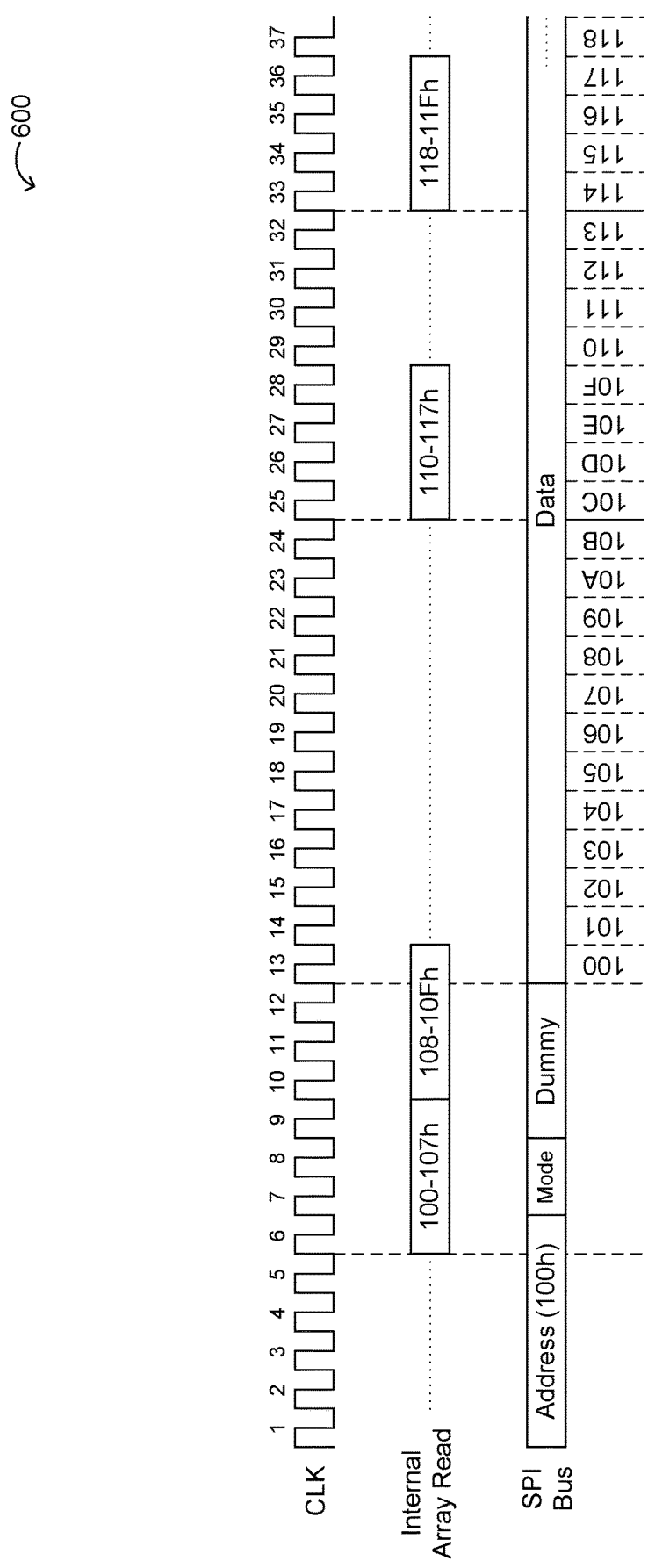
FIG. 6 is a timing diagram of an example aligned address read access, in accordance with embodiments of the present invention.

Referring now to FIG. 6, shown is a timing diagram of an example aligned address read access, in accordance with embodiments of the present invention. Example 600 shows a similar command in a more schematic way, and adds information on the internal NVM array (e.g., 316) access. Here, the requested address is 100h and takes 6 CLK cycles, the mode byte takes 2 cycles, and, in this example, there are 4 more dummy cycles before the requested data begins to be sent out at the rising edge of clock 13. Example 600 also shows the internal NVM memory array read accesses relative to the read request commands and the data that is output on the SPI bus. The first read access brings bytes 100 through 107h (for a total of 64-bits) over 4 cycles, and the second read access brings bytes 108 through 10Fh, also in 4 cycles. In this example, 8 bytes of data can be output via the SPI bus in an Octal (×8 I/O) or double-data rate (DDR) Quad (×4 I/O) configuration. In any event, note that the flash device waits until the data of the second read is almost available before starting to send first read data on the SPI bus. This is done to ensure that even in a non-aligned address request, the NVM can support streaming data out on each clock cycle, per the spec of the SPI protocol. Note also that the internal NVM array is designed to read a fixed number of bits in each access, whereby typically this number of bits equals the number of sense amplifiers that are activated for the read operation within the array. The examples shown are primarily with an array which reads 64-bits (8-bytes) in each access of the memory array.

Figure 7:
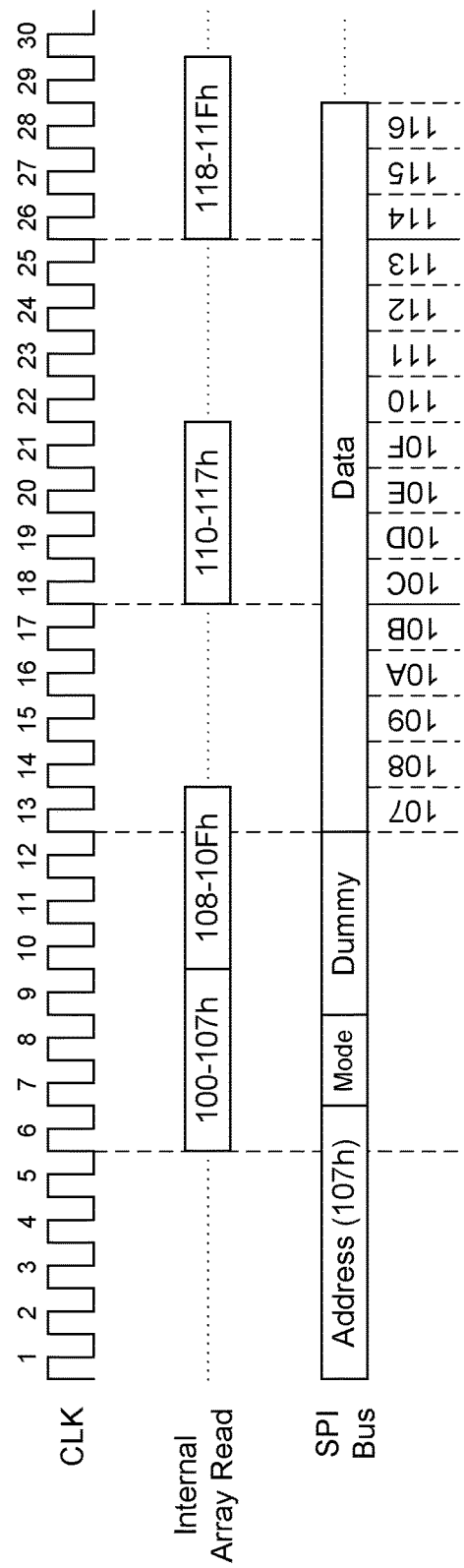
FIG. 7 is a timing diagram of an example non-aligned address read access, in accordance with embodiments of the present invention.

Referring now to FIG. 7, shown is a timing diagram of an example non-aligned address read access, in accordance with embodiments of the present invention. Example 700 shows what can occur when the requested address is not an aligned address. In this example, the SPI command requests byte 107h. Byte 107h comes from the first internal read in this sequence, but the following byte, 108h, needs to be taken from the second internal read. Because the NVM device waited for the second read to almost complete ensures that byte 108h could be sent out immediately after byte 107h, as required by the SPI bus protocol, whereby no "hiccups" are allowed.

Figure 8:
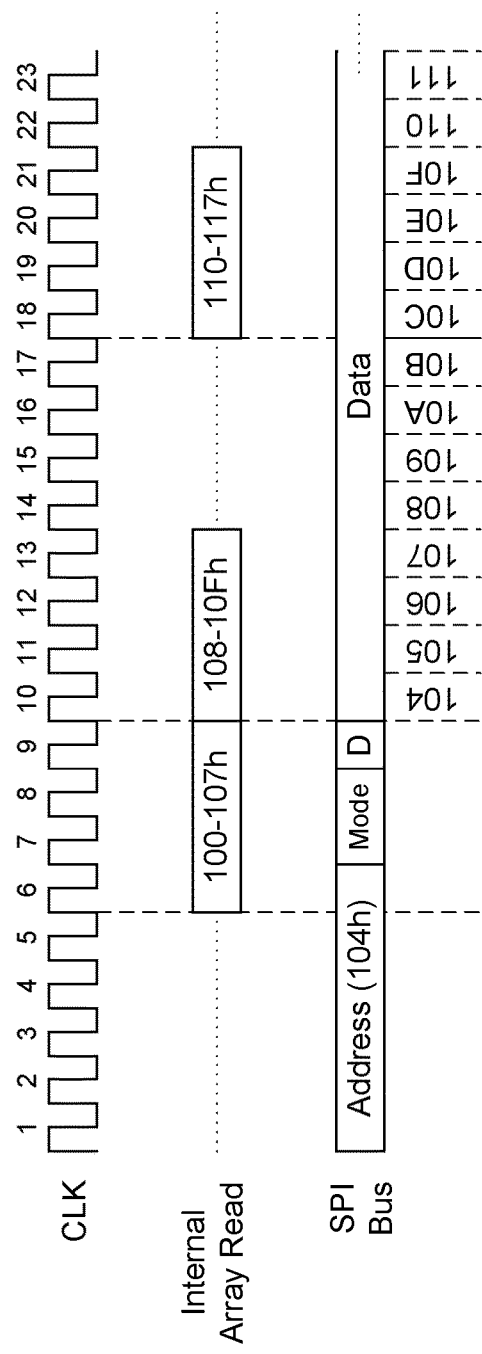
FIG. 8 is a timing diagram of an example DWA read access, in accordance with embodiments of the present invention.

Referring now to FIG. 8, shown is a timing diagram of an example DWA read access, in accordance with embodiments of the present invention. Example 800 shows a DWA command (e.g., the E7h command), which requires aligned address (e.g., the 2 LSB must be 0). As a result, only the first read need be performed before beginning streaming the data out, as the case in which data from the second read is to be required too early may not be encountered. Accordingly, number of cycles that the host need to wait for the data (e.g., via dummy cycles) may be reduced. In this example, the number of dummy cycles can be reduced from 4 cycles to just 1 cycle.

Figure 9:
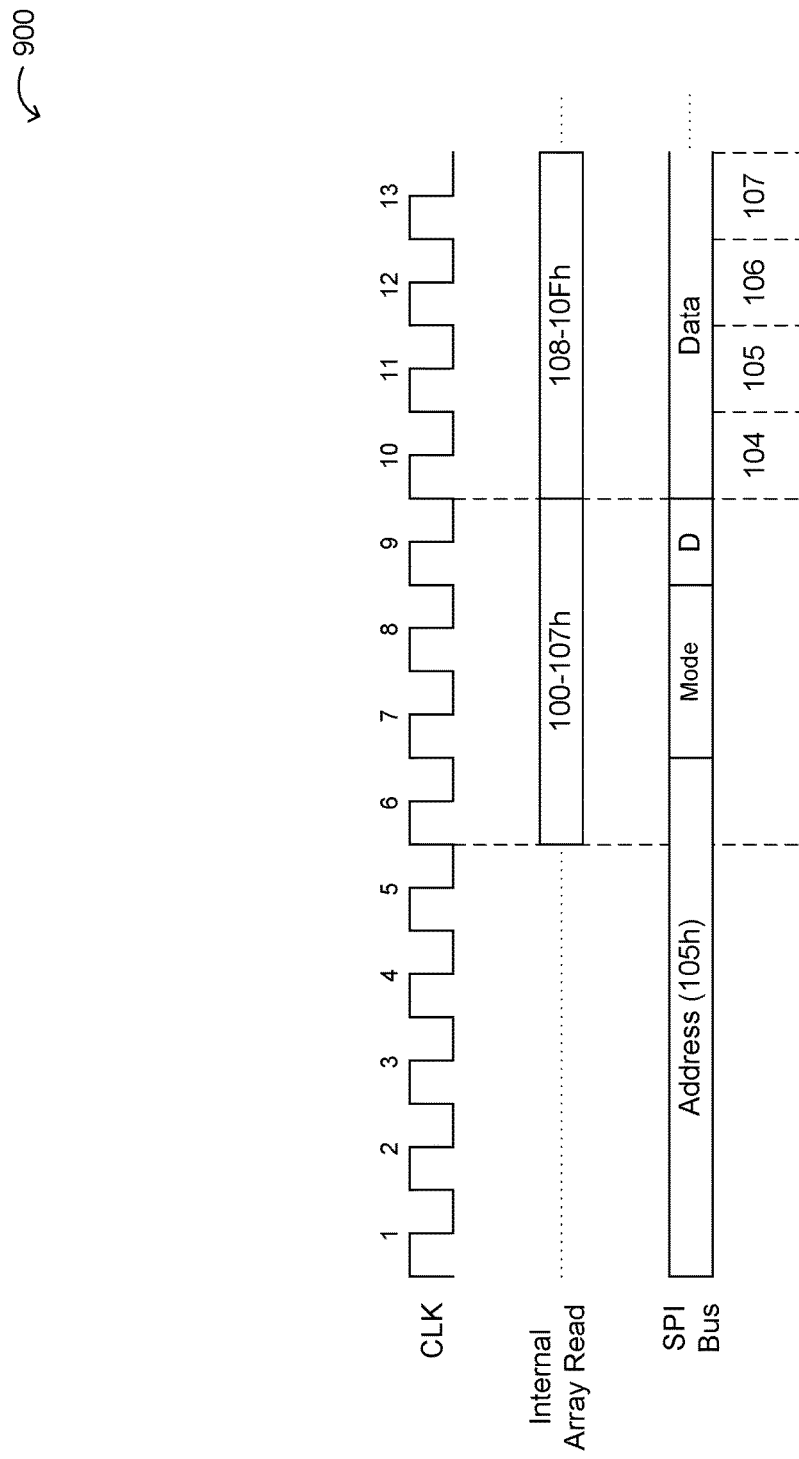
FIG. 9 is a timing diagram of another example DWA read access, in accordance with embodiments of the present invention.
Figure 10:
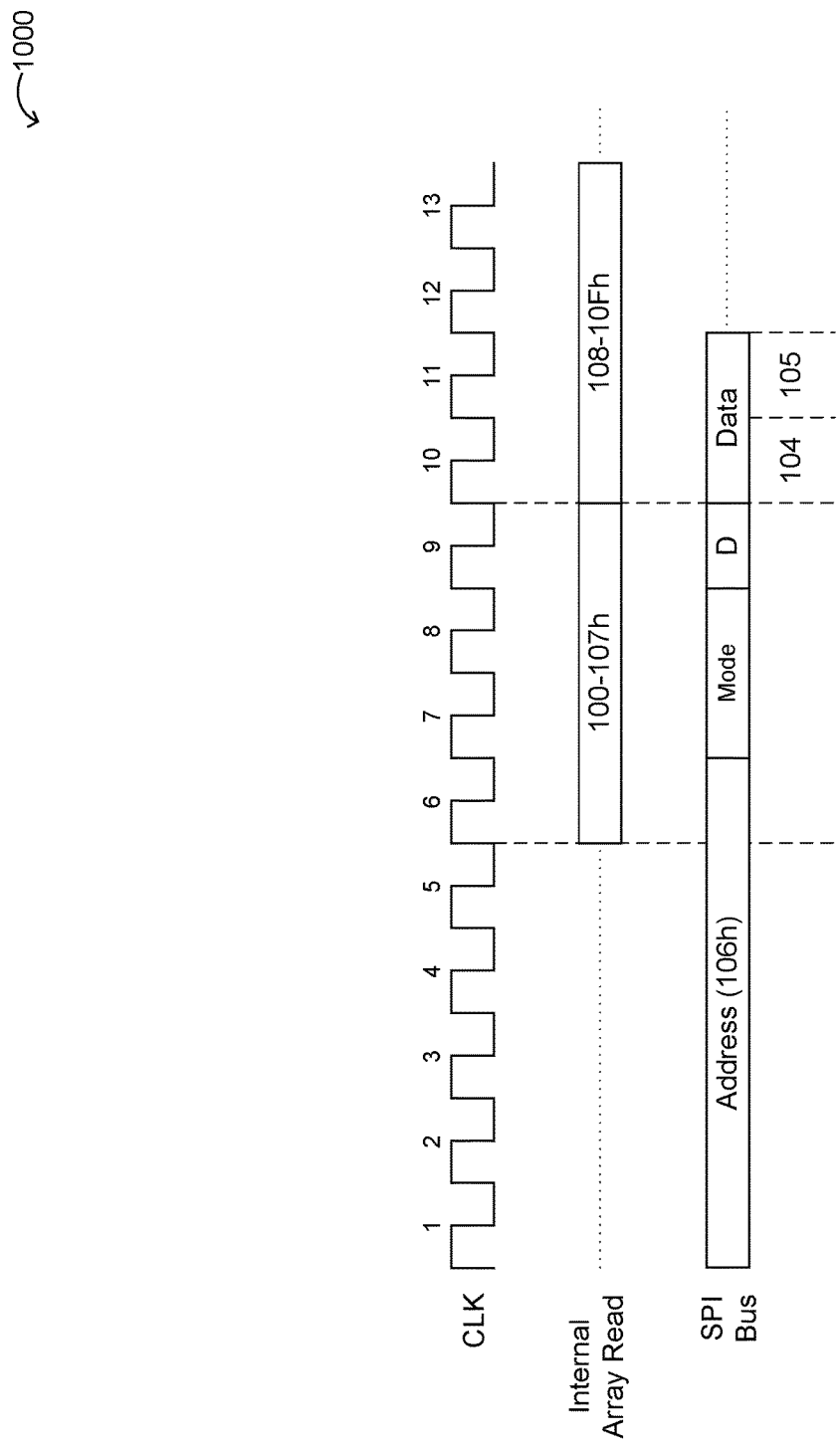
FIG. 10 is a timing diagram of an example DWA read access for word access, in accordance with embodiments of the present invention.
Figure 11:
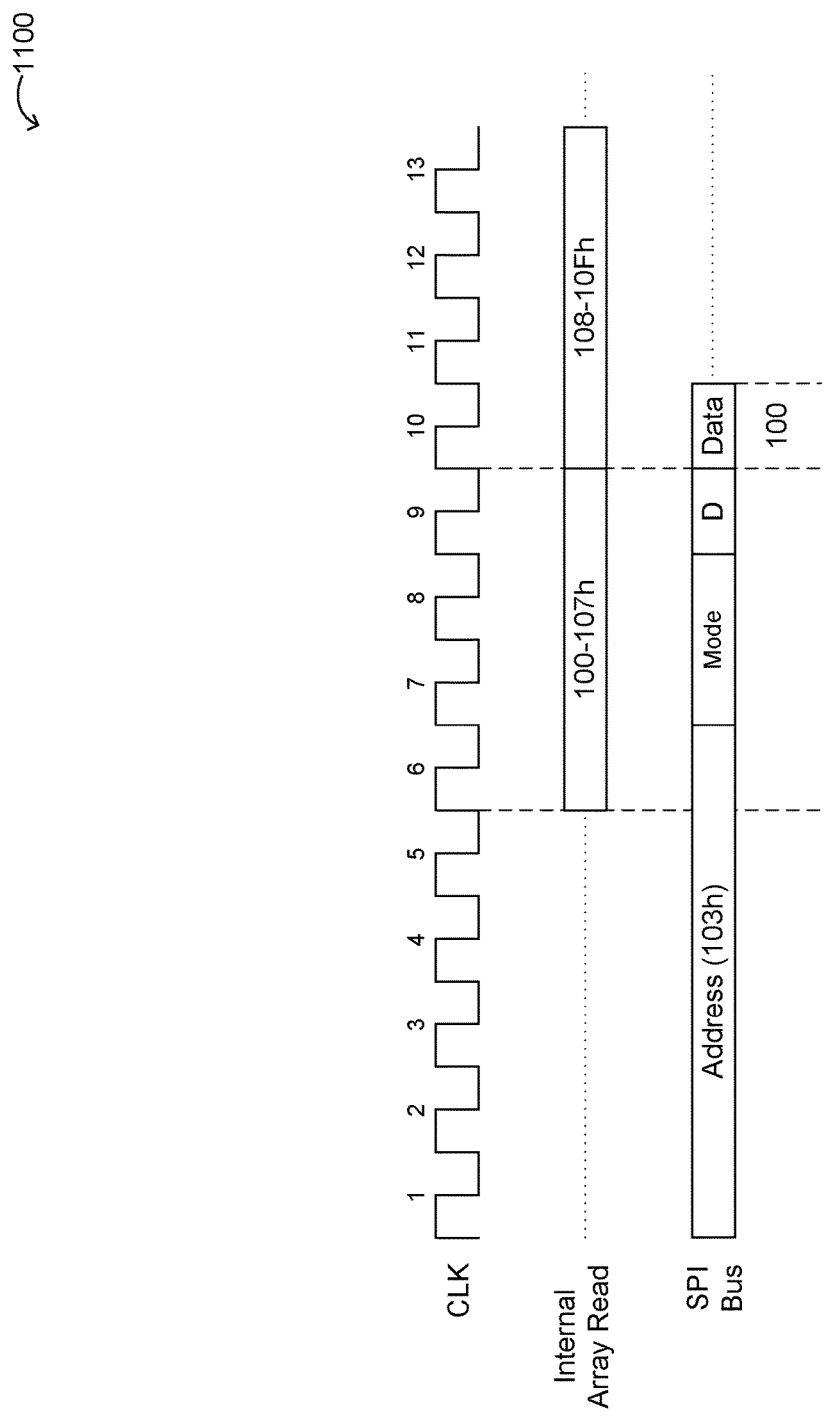
FIG. 11 is a timing diagram of an example DWA read access for byte access, in accordance with embodiments of the present invention.

Note that though the specification of the E7h command requires that the address be aligned, the NVM can ensure alignment by zeroing or clearing the 2 LSB of the address received from the interface, as discussed above. FIGS. 9, 10, and 11 respectively show double-word, word, and byte accesses in which the address sent on the SPI bus is not aligned, but the data that is returned from the NVM is for aligned addresses with the 2 LSBs cleared as a result of this internal LSB clearing function.

Referring now to FIG. 9, shown is a timing diagram of another example DWA read access, in accordance with embodiments of the present invention. In example 900, the data from address 105h is requested. However, because the 2 LSBs of the address are cleared, the data from address 104h is initially provided as part of the double-word over addresses 104h-107h.

Referring now to FIG. 10, shown is a timing diagram of an example DWA read access for word access, in accordance with embodiments of the present invention. In example 1000, the word data addressed by 106h is requested. However, because the 2 LSBs of the address are cleared, the word data from addresses 104h and 105h is instead incorrectly provided.

Referring now to FIG. 11, shown is a timing diagram of an example DWA read access for byte access, in accordance with embodiments of the present invention. In example 1100, the byte data addressed by 103h is requested. However, because the 2 LSBs of the address are cleared, the byte data from address 100h is instead incorrectly provided.

In particular embodiments, a mode is added to the DWA (E7h) and/or to another designated read command (e.g., EBh) in which the LSBs of the address are not cleared by the flash memory device, and a single internal memory array read access is performed before starting to send data back to the host device. Further, this mode can be controlled by a configuration bit in a status register (e.g., 406). When the configuration bit is cleared (e.g., by default), the E7h or other designated command may behave in support of backward compatibility, and can accordingly clear LSB address bits 0 and 1 at the beginning of the internal operation, as shown in FIGS. 9-11. However, when the configuration bit is set (e.g., 1), the device may let the address be used as-is and without modification, and even if this address is not aligned, as shown in FIGS. 12 and 13.

Figure 12:
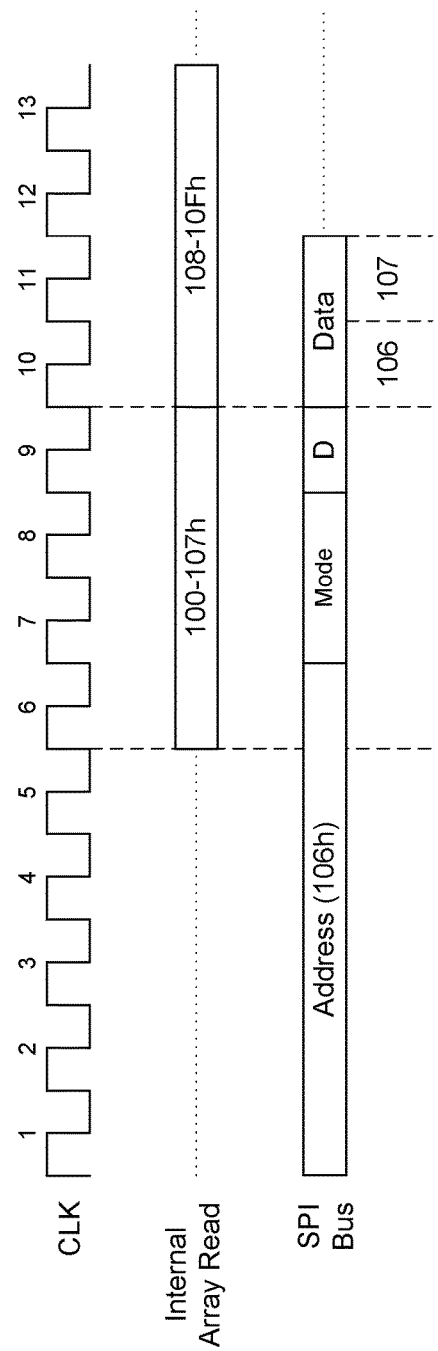
FIG. 12 is a timing diagram of an example modified DWA read access for word access, in accordance with embodiments of the present invention.

Referring now to FIG. 12, shown is a timing diagram of an example modified DWA read access for word access, in accordance with embodiments of the present invention. In example 1200, the word data addressed by 106h is requested for the read operation. Here, because the 2 LSBs of the address are not cleared and the full address is allowed through without modification, the word data from addresses 106h and 107h are provided with only one dummy cycle included in the read latency.

Figure 13:
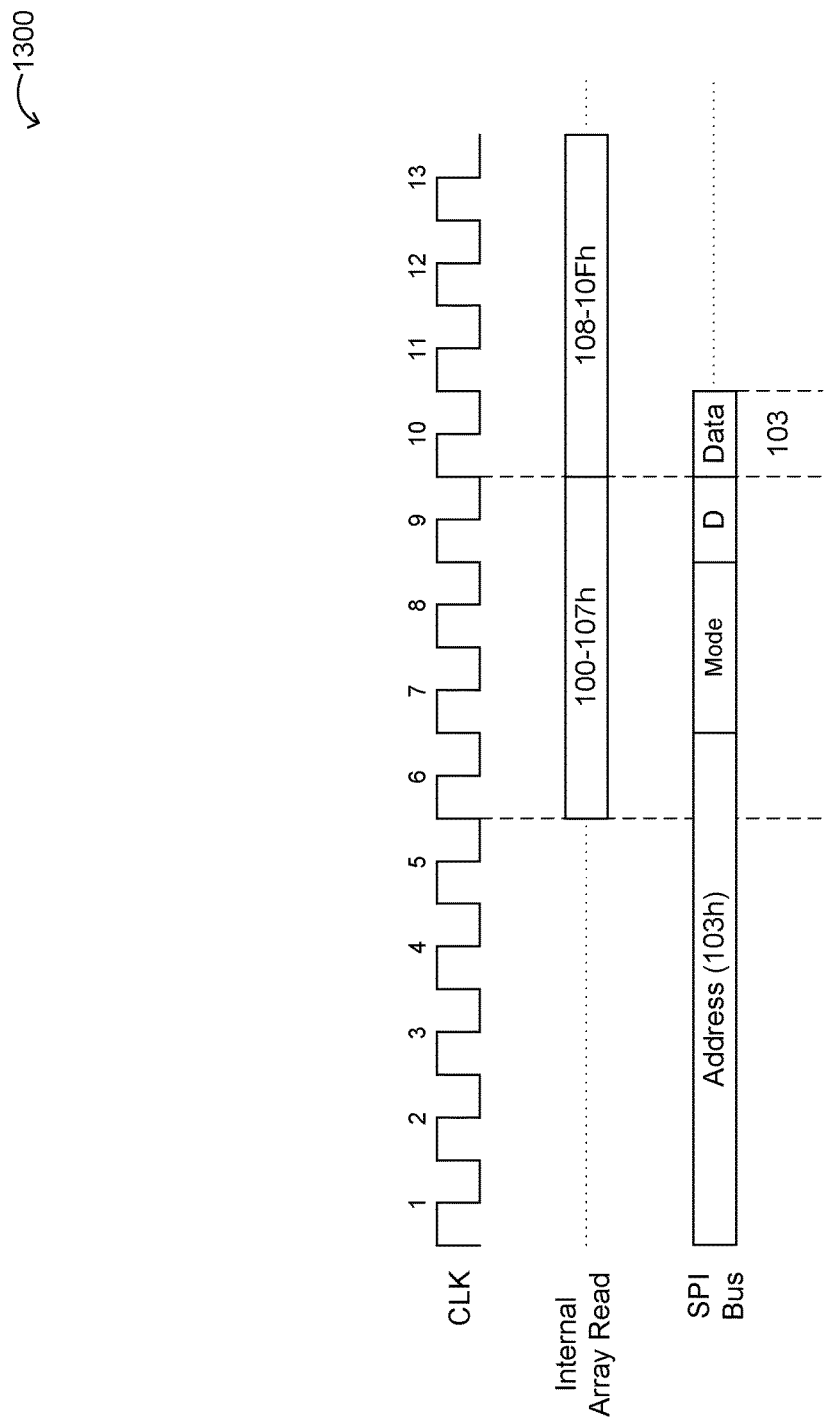
FIG. 13 is a timing diagram of an example modified DWA read access for byte access, in accordance with embodiments of the present invention.

Referring now to FIG. 13, shown is a timing diagram of an example modified DWA read access for byte access, in accordance with embodiments of the present invention. In example 1300, the byte data addressed by 103h is requested for the read operation. Here, because the 2 LSBs of the address are not cleared and the full address is allowed through without modification, the byte data from address 103h is provided with only one dummy cycle included in the read latency.

Figure 14:
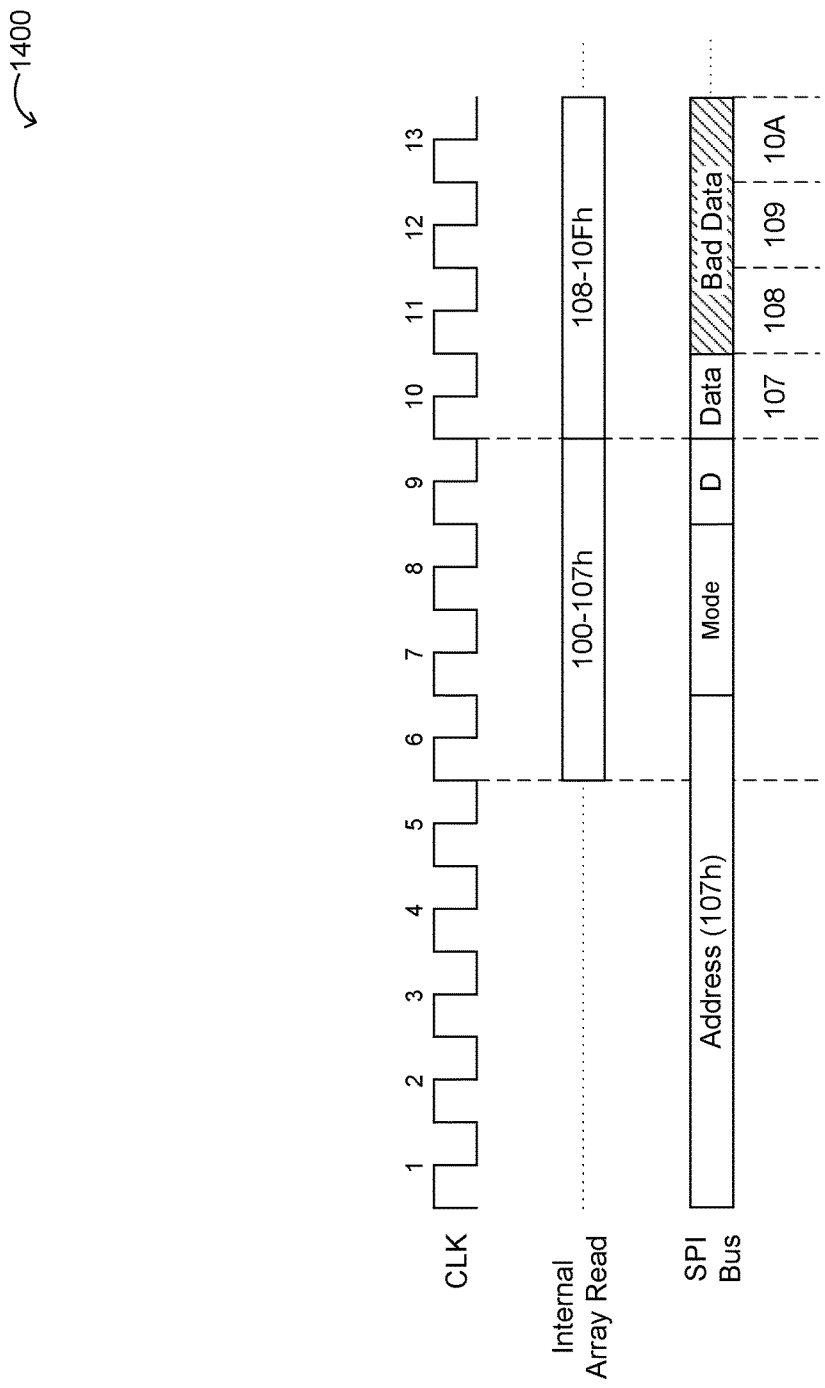
FIG. 14 is a timing diagram of an example modified DWA read access for double-word access, in accordance with embodiments of the present invention.

Referring now to FIG. 14, shown is a timing diagram of an example modified DWA read access for double-word access, in accordance with embodiments of the present invention. In example 1400, the double-word data addressed by 107h is requested for the read operation. Here, because the 2 LSBs of the address are not cleared and the full address is allowed through without modification, the first byte of the double-word data from address 107h is provided with only one dummy cycle included in the read latency. However, the subsequent 3 bytes corresponding to addresses 108h, 109h, and 10Ah may result in incorrectly read correctly data in this particular case because the data corresponding to these addresses is not ready in time. As such, this represents a case of limited functionality for the modified DWA read command as discussed herein.

Figure 15:
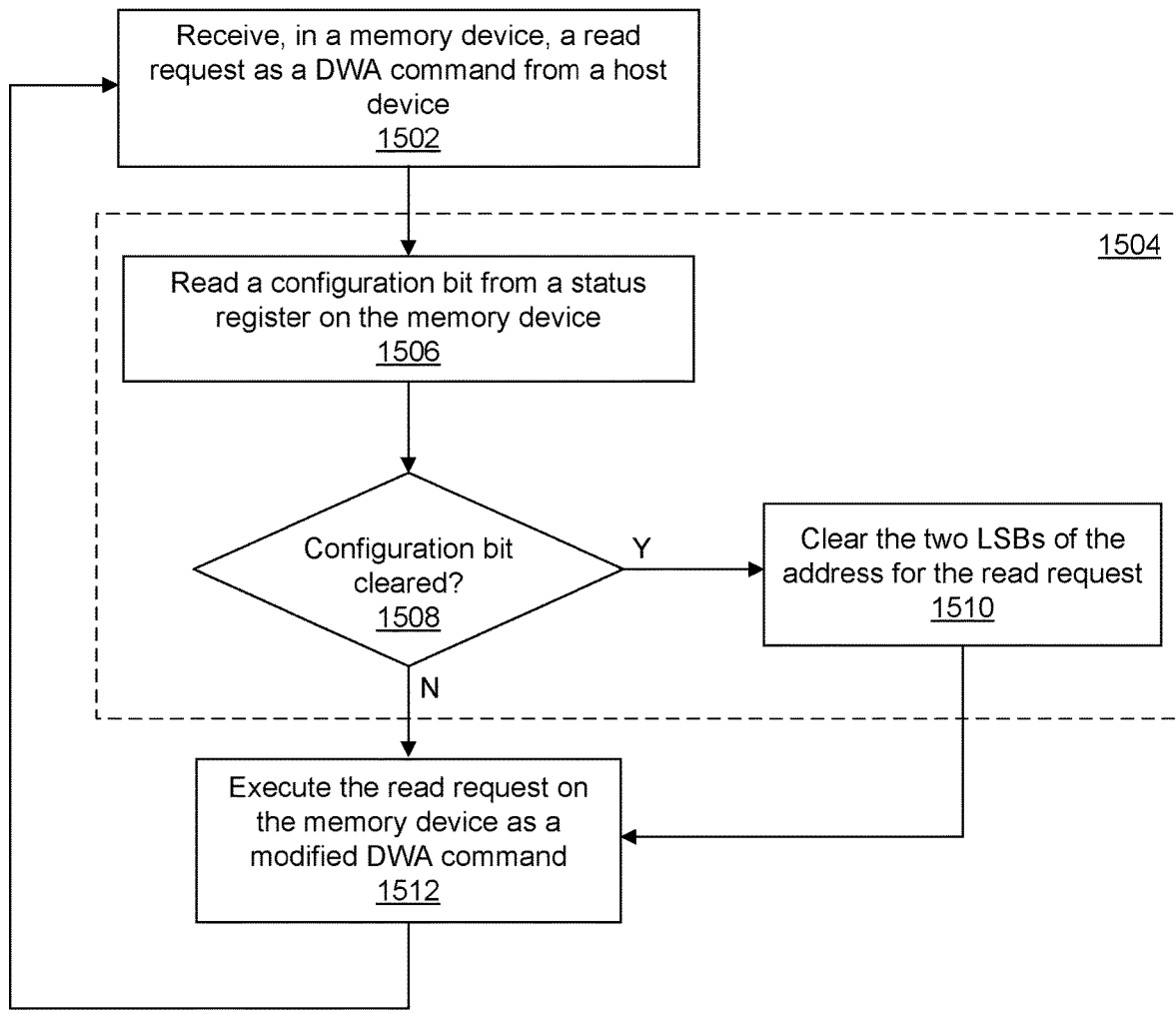
FIG. 15 is a flow diagram of an example method of controlling a read request, in accordance with embodiments of the present invention.

Referring now to FIG. 15, shown is a flow diagram of an example method of controlling a read request, in accordance with embodiments of the present invention. In example 1500, a DWA read request (or other designated read command) can be received in a memory device from a host device (e.g., via an SPI interface) at 1502. In some cases, the flow can proceed to 1512 execute the read request on the memory device as a modified DWA read command, or other modified read command, whereby a single internal memory array read access is performed before starting to send data back to the host device, and whereby the LSBs are not cleared in the flash memory device. In other cases, backward compatibility can be supported via 1504. At 1506, a configuration bit can be read from a status register (e.g., 406). If the configuration bit is cleared (1508), then the 2 LSBs of the address can be cleared (e.g., made '0') at 1510, in order to preserve backward compatibility. Otherwise, if the configuration bit is set (1508), then the read request can be executed on the memory device as a modified read command (e.g., DWA read command, EBh command, etc.) without clearing the LSBs or otherwise modifying the received address at 1512.

In particular embodiments, correct operation of the modified read command (e.g., DWA command) is found for a single aligned word read that occurs when the LSB of the address equals 0 (see, e.g., FIG. 12), a single byte read (see, e.g., FIG. 13), and any number of aligned double-words (when the two LSBs of the address equal 0). In the first two cases above, a second array read may not be required, such as for as long as the number of bits that are read from the array in parallel is 16 or a higher power of 2. In addition, accesses to aligned double-words in the third case above inherently satisfy the condition of the non-modified DWA command, whereby the two LSBs equal 0, and as such can operate correctly even if the modified command would not clear these LSBs in the flash memory device.

In any event, the modification to the DWA command in certain embodiments can effectively function with most SoCs. In such systems, there are typically 3 types sources for read commands from the NVM: cache fill, data read, and DMA read operations. In most systems, the cache fill operations can be performed with 16-byte or longer bursts that are aligned on their natural address boundary. Data read operations on most RISC CPUs are for single data items (e.g., byte, word, double-word), and can be broken into two accesses if the requested data is not address-aligned. For example, in the ARM architecture, a double-word read to address 103h can be split by the CPU to two read accesses, such that the boundary between addresses 103h and 104h is not straddled. DMA accesses may require long bursts that could start on a non-aligned address and straddle the alignment boundary in some cases. To overcome these limitations, the DMA programming can be modified such that the start address of longer bursts is aligned. In many systems, this requirement is viable, and as such the modified DWA read (E7h) command, or modified EBh command, can be utilized instead of the standard read (EBh) command for read requests.

Even if a flash device were to use a much faster array and thereby have a lower number of dummy cycles, if the traditional quad read command (EBh) takes X cycles, an E7h command that targets only aligned addresses may take Y cycles, where Y is less than X. This is because aligned instructions do not require the second array read before beginning to stream data out from the memory device. Further, the possible error condition of bad data as shown in FIG. 14 can be avoided by programming the host device to accommodate only aligned address read requests. In addition, the DMA driver can ensure that double-word accesses are aligned in most cases, and the traditional EBh command can still be supported by the memory device for any flash read operations whereby address alignment is not feasible.

In this way, by saving 2 or even 3 cycles of latency in every NVM read operation, the system performance can be improved in terms of both speed and power consumption. For example, in a system where the bulk of the NVM accesses are for instruction cache fill operations, the modified DWA command for bringing an 8-byte cache line may take 17 cycles, while the standard EBh command may take 20 cycles. As such, a program that is limited by cache line misses could run up to, e.g., about 18% faster. The savings in power may depend on how much power the CPU may waste while waiting the extra 3 cycles. In most systems, even when waiting for instructions, the pipeline may remain active, such as by processing previous instructions, and thereby the CPU may remain spending about as much power as it does when the CPU is not waiting for data to be provided. If that is the case, the power savings may be equivalent to the performance improvement (e.g., 18%). However, if the CPU's pipeline were to be completely drained while waiting for data, before these 3 extra cycles, the power during these cycles can accordingly be reduced. In such cases, the power savings would be smaller and may correspond to the power that is spent when the pipeline is drained. For example, this may result in performance improvement of about 18%, and power improvement may range from about 5% to about 18%.

While the above examples include circuit, operational, and structural implementations of certain memory arrangements and devices, one skilled in the art will recognize that other technologies and/or architectures, as well as other modes of operation, can be used in accordance with embodiments. Further, one skilled in the art will recognize that other device circuit arrangements, architectures, elements, and the like, may also be used in accordance with embodiments. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method, comprising:
   a) receiving, in a memory device, a read request from a host device that is coupled to the memory device by an interface;
   b) decoding an address of the read request that is received from the interface;
   c) decoding a command of the read request to determine whether the read request is for an aligned address operation;
   d) maintaining the decoded address without modification when the read request is determined as being for the aligned address operation regardless of an actual alignment of the decoded address;
e) executing the read request as the aligned address operation on the memory device by using the decoded address;
f) accessing a configuration bit on the memory device; and
g) performing the maintaining and the executing steps only when the configuration bit is a first state and the read request is determined as being for the aligned address operation.

2. The method of claim 1, wherein the aligned address operation is a double-word aligned (DWA) read operation.

3. The method of claim 1, further comprising:
a) clearing a predetermined number of least significant bits (LSBs) from the decoded address to form a modified address when the configuration bit is a second state and the read request is for the aligned address operation; and
b) executing the read request as the aligned address operation on the memory device by using the modified address when the configuration bit is the second state.

4. The method of claim 1, wherein:
a) the memory device comprises a non-volatile memory; and
b) the interface comprises a serial interface.

5. The method of claim 1, wherein the decoding the command of the read request to determine whether the read request is for the aligned address operation comprises matching an opcode to a predetermined opcode.

6. The method of claim 1, wherein a read latency of the aligned address operation is less than a read latency for an operation without address limitations.

7. The method of claim 1, wherein the aligned address operation is a single byte read operation.

8. The method of claim 1, wherein the aligned address operation is a single aligned word read operation.

9. The method of claim 1, wherein the host device is configured to ensure that a starting address is aligned for a direct memory access (DMA) comprising the aligned address operation.

10. A memory device comprising a status register having a configuration bit, the memory device being configured to:
a) receive, by an interface, a read request from a host device;
b) decode an address of the read request;
c) decode a command of the read request to determine whether the read request is for an aligned address operation;
d) maintain the decoded address without modification when the read request is determined as being for the aligned address operation regardless of an actual alignment of the decoded address;
e) execute the read request as the aligned address operation on the memory device by using the decoded address; and
f) wherein the decoded address is maintained and the read request is executed using the decoded address only when the configuration bit is a first state and the read request is determined as being for the aligned address operation.

11. The memory device of claim 10, wherein the aligned address operation is a double-word aligned (DWA) read operation.

12. The memory device of claim 10, wherein:
a) a predetermined number of least significant bits (LSBs) are cleared from the decoded address to form a modified address when the configuration bit is a second state and the read request is for the aligned address operation; and
b) the read request is executed as the aligned address operation on the memory device by using the modified address when the configuration bit is the second state.

13. The memory device of claim 10, comprising a non-volatile memory, and wherein the interface comprises a serial interface.

14. The memory device of claim 10, wherein the command of the read request is decoded to determine whether the read request is for the aligned address operation by matching an opcode to a predetermined opcode.

15. The memory device of claim 10, wherein a read latency of the aligned address operation is less than a read latency for an operation without address limitations.

16. The memory device of claim 10, wherein the aligned address operation is a single byte read operation.

17. The memory device of claim 10, wherein the aligned address operation is a single aligned word read operation.

18. The memory device of claim 10, wherein the host device is configured to ensure that a starting address is aligned for a direct memory access (DMA) comprising the aligned address operation.

* * * * *